US012692341B2

United States Patent
(12) United States Patent
Shibamoto et al.

(10) Patent No.: US 12,692,341 B2
(45) Date of Patent: Jul. 28, 2026

(54) CURABLE COMPOSITION

(71) Applicant: DAICEL CORPORATION, Osaka (JP)

(72) Inventors: Akihiro Shibamoto, Tokyo (JP); Takashi Yoshimura, Himeji (JP); Yukio Asai, Himeji (JP)

(73) Assignee: DAICEL CORPORATION, Osaka (JP)

( * ) Notice: Subject to any disclaimer, the term of this patent is extended or adjusted under 35 U.S.C. 154(b) by 572 days.

(21) Appl. No.: 18/266,395

(22) PCT Filed: Jan. 20, 2022

(86) PCT No.: PCT/JP2022/001983
§ 371 (c)(1),
(2) Date: Jun. 9, 2023

(87) PCT Pub. No.: WO2022/168620
PCT Pub. Date: Aug. 11, 2022

(65) Prior Publication Data

US 2024/0043605 A1 Feb. 8, 2024

(30) Foreign Application Priority Data

Feb. 8, 2021 (JP) ................................ 2021-018313

(51) Int. Cl.
*C08G 59/02* (2006.01)
*C08G 59/32* (2006.01)
(Continued)

(52) U.S. Cl.
CPC ......... *C08G 59/02* (2013.01); *C08G 59/3281* (2013.01); *C08G 65/22* (2013.01);
(Continued)

(58) Field of Classification Search
CPC combination set(s) only.
See application file for complete search history.

(56) References Cited

U.S. PATENT DOCUMENTS

2015/0275043 A1* 10/2015 Kikuchi .................. C09D 7/47
428/447

FOREIGN PATENT DOCUMENTS

JP 2008134618 A * 6/2008
JP 5626081 B2 11/2014
JP 2015-193747 A 11/2015

OTHER PUBLICATIONS

International Preliminary Report on Patentability and English translation of the Written Opinion of the International Searching Authority for InternationalApplication No. PCT/JP2022/001983, dated Aug. 3, 2023.

(Continued)

*Primary Examiner* — Peter A Salamon
(74) *Attorney, Agent, or Firm* — Birch, Stewart, Kolasch & Birch, LLP

(57) ABSTRACT

Provided is a curable composition that can form a lens having excellent visibility, antiglare effects, and contrast-enhancing effects by suppressing thermal degradation of a tetraazaporphyrin compound. The curable composition according to the present disclosure includes silsesquioxane containing a cyclohexene oxide group, and a tetraazaporphyrin compound having an absorption peak in a wavelength region of from 570 to 605 nm, in which a content of the tetraazaporphyrin compound is from 1000 to 10000 ppm by weight of a content of the silsesquioxane.

11 Claims, 2 Drawing Sheets

(51) Int. Cl.

| | |
|---|---|
| ***C08G 65/22*** | (2006.01) |
| ***C08G 77/14*** | (2006.01) |
| ***C08K 5/34*** | (2006.01) |
| ***C08L 83/04*** | (2006.01) |
| ***C09D 171/02*** | (2006.01) |
| ***C09D 183/12*** | (2006.01) |

(52) U.S. Cl.

CPC ................ *C08G 77/14* (2013.01); *C08K 5/34* (2013.01); *C08L 83/04* (2013.01); *C09D 171/02* (2013.01); *C09D 183/12* (2013.01)

(56) References Cited

OTHER PUBLICATIONS

International Search Report for International Application No. PCT/JP2022/001983, dated Mar. 8, 2022, with English translation.
Extended European Search Report for European Application No. 22749495.2, dated Oct. 25, 2024.

* cited by examiner

CURABLE COMPOSITION

TECHNICAL FIELD

The present disclosure relates to a curable composition containing silsesquioxane and a tetraazaporphyrin compound. The present application claims priority from the Japanese Patent Application No. 2021-018313 filed in Japan on Feb. 8, 2021, the content of which is incorporated herein by reference.

BACKGROUND ART

It has been known that spectacles such as sunglasses and goggles can achieve antiglare effects and contrast-enhancing effects by suppressing transmission of light at a particular wavelength.

For example, Patent Document 1 discloses that a lens having excellent antiglare effects and contrast-enhancing effects is obtained by a method in which 0.001 wt. % of a tetraazaporphyrin compound having a sharp absorption peak around 585 nm is added to a plastic lens raw material such as a polycarbonate-based thermoplastic resin, melt-kneaded at 280° C. and then injection-molded.

CITATION LIST

Patent Document

Patent Document 1: JP 5626081 B

SUMMARY OF INVENTION

Technical Problem

As a result of studies conducted by the present inventors on the method described above, the following issues are found.

1. Since a tetraazaporphyrin compound, which is expensive, deteriorates when exposed to a high temperature in melt-kneading and injection-molding together with the thermoplastic resin, to achieve desired antiglare effects and contrast-enhancing effects, an excessive amount of the tetraazaporphyrin compound has to be added to make up for the deteriorated amount, and thus the cost is high.
2. A tetraazaporphyrin compound is a compound that exhibits blue to purple color, and when a large amount of the tetraazaporphyrin compound is added to a plastic lens raw material, the resulting lens is colored with dark blue to purple, and thus the decorative value is reduced.
3. When a tetraazaporphyrin compound is exposed to a high temperature, a thermal decomposition product of the tetraazaporphyrin compound is produced. The thermal decomposition product affects in a manner that the absorption peak becomes broader and thus reduces visibility.

An object of the present disclosure is to provide a curable composition that can form a lens having excellent visibility, antiglare effects, and contrast-enhancing effects by suppressing thermal degradation of a tetraazaporphyrin compound.

Another object of the present disclosure is to provide a curable composition that has excellent storage stability and that can form a lens having excellent visibility, antiglare effects, and contrast-enhancing effects by suppressing thermal degradation of a tetraazaporphyrin compound.

Another object of the present disclosure is to provide a hard coating film that has excellent visibility, antiglare effects, and contrast-enhancing effects and that does not impair color of a lens.

Another object of the present disclosure is to provide a method for producing a lens having excellent visibility, antiglare effects, and contrast-enhancing effects by suppressing thermal degradation of a tetraazaporphyrin compound.

Another object of the present disclosure is to provide a lens that has excellent visibility, antiglare effects, and contrast-enhancing effects and that has high decorative value.

Another object of the present disclosure is to provide spectacles that have excellent visibility, antiglare effects, and contrast-enhancing effects and that have high decorative value.

Solution to Problem

As a result of diligent research to solve the issues described above, the present inventors found that, when a hard coating film containing a tetraazaporphyrin compound is formed on a lens surface without kneading the tetraazaporphyrin compound into the lens, deterioration due to exposure of the tetraazaporphyrin compound to high temperature can be minimized, and even when the amount of the tetraazaporphyrin compound to be used is reduced compared to typical amounts, excellent antiglare effects and contrast-enhancing effects that are the same degree to or better than typical effects can be imparted to the lens. Furthermore, it was found that, because silsesquioxane containing a cyclohexene oxide group is also soluble in a solvent that dissolves a tetraazaporphyrin compound, dissolving a tetraazaporphyrin compound and silsesquioxane containing a cyclohexene oxide group in a solvent can improve applicability, enabling a hard coating film containing the tetraazaporphyrin compound to be easily formed on a lens surface. The present disclosure has been completed based on these findings.

That is, the present disclosure provides a curable composition including: silsesquioxane containing a cyclohexene oxide group, and a tetraazaporphyrin compound having an absorption peak in a wavelength region of from 570 to 605 nm, in which a content of the tetraazaporphyrin compound is from 1000 to 10000 ppm by weight of a content of the silsesquioxane.

The present disclosure also provides the curable composition described above, where the silsesquioxane contains a structural unit represented by Formula (I) and a structural unit represented by Formula (II) below:

$$[R^aSiO_{3/2}] \quad (I)$$

where in Formula (I), $R^a$ represents a group containing a cyclohexene oxide group, a substituted or unsubstituted aryl group, a substituted or unsubstituted aralkyl group, a substituted or unsubstituted cycloalkyl group, a substituted or unsubstituted alkyl group, a substituted or unsubstituted alkenyl group, or a hydrogen atom; and $$[R^aSiO_{2/2}(OR^b)] \quad (II)$$

where in Formula (II), $R^a$ is the same as described above, and $R^b$ represents a hydrogen atom or an alkyl group having from 1 to 4 carbons;

in which a ratio of a content of the structural unit represented by Formula (I) to a content of the structural unit represented by Formula (II) (former/latter; molar ratio) is from 5 to 500; and a proportion of the structural units represented by Formulas (I), (II) above, in which $R^a$ in the formulas represents a group containing a cyclohexene oxide group is from 50 to 100 mol % with respect to a total amount of structural units of the silsesquioxane.

The present disclosure also provides the curable composition described above which is a composition for hard coating layer formation.

The present disclosure also provides a hard coating film made of a cured product of the curable composition described above.

The present disclosure also provides the hard coating film described above, where, in a transmission spectrum, a minimum value of a downward peak is in a wavelength region of from 570 to 605 nm, a transmittance (t1) of the minimum value is 80% or less, a ratio (t2/t1) of a transmittance (t2) at a wavelength of 550 nm to the transmittance (t1) is 1.1 or greater, and a ratio (t3/t1) of a transmittance (t3) at a wavelength of 625 nm to the transmittance (t1) is 1.1 or greater.

The present disclosure also provides a method for producing a hard coated lens, the method including: applying the curable composition described above to a lens surface and subjecting to curing to obtain a hard coated lens including a hard coating film containing a cured product of the curable composition.

The present disclosure also provides a hard coated lens including the hard coating film described above on a lens surface.

The present disclosure also provides spectacles including the hard coated lens described above.

Advantageous Effects of Invention

Because the curable composition according to the present disclosure includes a composition described above, the curable composition is useful as a composition for hard coating layer formation. By applying the curable composition to a lens surface and subjecting to curing, a hard coated lens having excellent antiglare effects and contrast-enhancing effects can be produced with minimum high temperature exposure of the tetraazaporphyrin compound. Thus, reduction in visibility due to thermal decomposition product of the tetraazaporphyrin compound can be suppressed, and significantly excellent visibility can be imparted to the hard coated lens in addition to excellent antiglare effects and contrast-enhancing effects.

Furthermore, because exposure to high temperatures can be minimized when the curable composition is used, the thermal decomposition of the tetraazaporphyrin compound can be suppressed, and adding a large amount of the tetraazaporphyrin compound to supplement thermal decomposition products is not required. Thus, since the curable composition can reduce the amount of tetraazaporphyrin compound to be added compared with the known amounts, when the curable composition is used, a hard coating film, in which coloration due to the tetraazaporphyrin compound is suppressed, can be formed. For the hard coated lens having a hard coating film in which coloration is suppressed, a wider range of color choices for the lens becomes available, increasing design value. Furthermore, although the tetraazaporphyrin compound is expensive, by reducing its amount to be added, a hard coating film can be formed at a low cost.

DESCRIPTION OF EMBODIMENTS

Curable Composition

Figure 1:
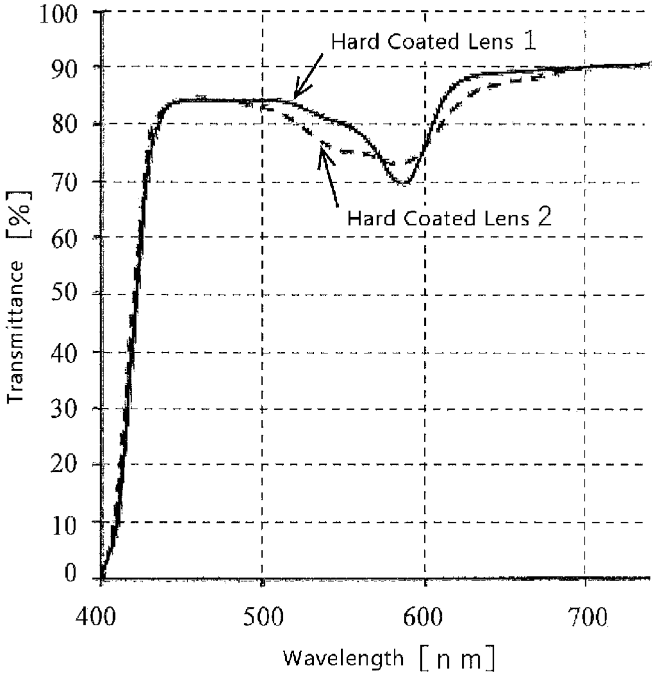
FIG. 1 indicates a transmittance curve for the hard coated lens 1 obtained in Example and the hard coated lens 2 obtained in Comparative Example.

The curable composition according to the present disclosure includes silsesquioxane containing a cyclohexene oxide group, and a tetraazaporphyrin compound having an absorption peak in a wavelength region of from 570 to 605 nm. The curable composition is useful as a composition for hard coating layer formation.

The curable composition may contain one, or two or more of other components as necessary besides the components described above. Examples of those other components include curing catalysts, solvents, leveling agents, antifoaming agents, foam stabilizers, ultraviolet absorbers, heat stabilizers, antioxidants, light stabilizers, plasticizers, lubricants, fillers, flame retardants, antistatic agents, and coloring materials.

Tetraazaporphyrin Compound

The tetraazaporphyrin compound has a sharp absorption peak in a wavelength region of from 570 to 605 nm (preferably from 575 to 600 nm, more preferably from 580 to 595 nm, and particularly preferably from 580 to 590 nm) of an absorption spectrum measured using a chloroform solution.

The absorption (A1) of the maximum value of the absorption peak is, for example, 80% or greater, preferably 90% or greater, and particularly preferably 95% or greater.

The ratio (A1/A2) of the absorption (A1) to the absorption (A2) at a wavelength of 550 nm of the absorption spectrum is, for example, 1.5 or greater, preferably 2.0 or greater, and particularly preferably 3.0 or greater.

The ratio (A1/A3) of the absorption (A1) to the absorption (A3) at a wavelength of 625 nm of the absorption spectrum is, for example, 10 or greater, and preferably 20 or greater.

Examples of the tetraazaporphyrin compound include compounds represented by Formula (p) below.

[Chem. 1]

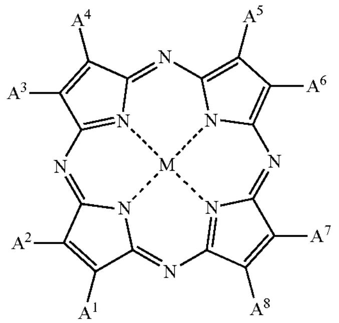

(p)

In Formula (p) above, $A^1$ to $A^8$ are the same or different and each represent a hydrogen atom, a halogen atom, a nitro group, a cyano group, a hydroxy group, a substituted or unsubstituted amino group, a carboxyl group, a sulfonic acid group, a hydrocarbon group, an —OR group, or an —SR group (R represents a hydrocarbon group). Two groups selected from $A^1$ to $A^8$ may be bonded to each other to form a ring together with adjacent carbon atoms. M represents two hydrogen atoms, two monovalent metal atoms, a bivalent metal atom, a trivalent metal atom with one substitution, a quadrivalent metal atom with two substitutions, or an oxidized metal atom.

Examples of the substituted amino group include mono- or di-($C_{1-20}$) alkylamino groups.

The hydrocarbon group includes aliphatic hydrocarbon groups, alicyclic hydrocarbon groups, aromatic hydrocarbon groups, and groups obtained by bonding these. For the hydrocarbon group, aliphatic hydrocarbon groups and/or aromatic hydrocarbon groups are preferred.

For the aliphatic hydrocarbon group, aliphatic hydrocarbon groups having from 1 to 20 carbons are preferred. Examples of the aliphatic hydrocarbon group having from 1 to 20 carbons include alkyl groups having from 1 to 20 (preferably from 1 to 10, and particularly preferably from 1 to 3) carbons, such as a methyl group, an ethyl group, a propyl group, an isopropyl group, a butyl group, an isobutyl group, an s-butyl group, a t-butyl group, a pentyl group, a hexyl group, a decyl group, and a dodecyl group; alkenyl groups having from 2 to 20 (preferably from 2 to 10, and particularly preferably from 2 to 3) carbons, such as a vinyl group, an allyl group, and a 1-butenyl group; and alkynyl groups having from 2 to 20 (preferably from 2 to 10, and particularly preferably from 2 to 3) carbons, such as an ethynyl group and a propynyl group.

Examples of the aromatic hydrocarbon group include aryl groups having from 6 to 10 carbons such as a phenyl group and a naphthyl group.

For example, the hydrocarbon group may have a substituent such as a halogen atom.

Examples of the ring that may be formed by allowing two groups selected from $A^1$ to $A^8$ to be bonded to each other together with adjacent carbon atoms include aliphatic hydrocarbon rings having from 3 to 6 carbons and aromatic hydrocarbon rings having from 6 to 10 carbons.

M represents two hydrogen atoms, two monovalent metal atoms, a bivalent metal atom, a trivalent metal atom with one substitution, a quadrivalent metal atom with two substitutions, or an oxidized metal atom, and is preferably a bivalent metal atom or an oxidized metal atom.

Examples of the bivalent metal atom include Cu, Zn, Fe, Co, Ni, Ru, Rh, Pd, Pt, Mn, Mg, Ti, Be, Ca, Ba, Cd, Hg, Pb, and Sn.

Examples of the oxidized metal atom include VO, MnO, and TiO.

For the tetraazaporphyrin compound, for example, commercially available products such as trade name "FDG-006" (available from Yamada Chemical Co., Ltd.) can be suitably used.

The content of the tetraazaporphyrin compound is, for example, from 1000 to 10000 ppm by weight of a content of the silsesquioxane. The upper limit of the content is preferably 8000 ppm by weight, particularly preferably 7000 ppm by weight, most preferably 6000 ppm by weight, and especially preferably 5000 ppm by weight, from the viewpoint of suppressing reduction in decorative value while excellent antiglare effects and excellent contrast-enhancing effects are achieved. The lower limit of the content is preferably 2000 ppm by weight, particularly preferably 2500 ppm by weight, and most preferably 3000 ppm by weight, from the viewpoint of enhancing antiglare effects and contrast-enhancing effects.

When the curable composition of the present disclosure is used, a hard coating film containing the tetraazaporphyrin compound can be formed on a lens surface while exposure of the tetraazaporphyrin compound to high temperatures is suppressed, and thus the amount of the tetraazaporphyrin compound in the composition does not need to be increased based on anticipation of thermal degradation. Thus, the cost for the tetraazaporphyrin compound can be reduced.

Silsesquioxane

The silsesquioxane is a compound having a main chain backbone made of a siloxane bond (Si—O—Si bond) and a group containing a cyclohexene oxide group bonded to the main chain backbone.

The silsesquioxane may be a compound having a main chain backbone with a siloxane bond and a group containing a cyclohexene oxide group and a substituted or unsubstituted aryl group (e.g., a phenyl group) that are bonded to the main chain backbone.

The group containing the cyclohexene oxide group is represented by Formula (1a) or (1b) below. In the formulas below, $R^{1a}$ and $R^{1b}$ are the same or different and each represent an alkylene group having from 1 to 10 carbons. A bond with a wavy line bonds to the main chain backbone made of the siloxane bond.

[Chem. 2]

(1a)

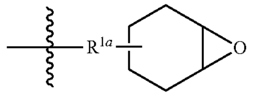

(1b)

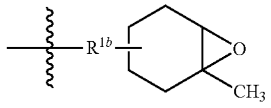

Examples of the alkylene group having from 1 to 10 carbons include linear or branched alkylene groups, such as a methylene group, a methylmethylene group, an ethylene group, a dimethylene group, a dimethylmethylene group, a propylene group, and a trimethylene group.

The silsesquioxane includes those having a structure of various types, such as a ladder-type structure, a complete cage-type structure, an incomplete cage-type structure, and a random-type structure. Among them, a silsesquioxane having an incomplete cage-type structure is preferred from the viewpoint of being able to form a cured product with high hardness.

The silsesquioxane having an incomplete cage-type structure contains a structural unit represented by Formula (I) and a structural unit represented by Formula (II) below:

$$[R^aSiO_{3/2}] \quad (I)$$

where in Formula (I), $R^a$ represents a group containing a cyclohexene oxide group, a substituted or unsubstituted aryl group, a substituted or unsubstituted aralkyl group, a substituted or unsubstituted cycloalkyl group, a substituted or unsubstituted alkyl group, a substituted or unsubstituted alkenyl group, or a hydrogen atom; and $$[R^aSiO_{2/2}(OR^b)] \quad (II)$$

where in Formula (II), $R^a$ is the same as described above, and $R^b$ represents a hydrogen atom or an alkyl group having from 1 to 4 carbons;

in which, of the total amount of the structural unit represented by Formula (I) and the structural unit represented by Formula (II) constituting the silsesquioxane, at least one of the structural units is a structural unit in which $R^a$ is a group containing a cyclohexene oxide group.

The structural unit represented by Formula (I) above is a structural unit represented by Formula (I') below and is referred to as a T3 form. Furthermore, the structural unit represented by Formula (II) above is a structural unit represented by Formula (In below and is referred to as a T2 form. Both of these structural units are T units. Three oxygen atoms bonded to the silicon atom illustrated in the structure represented by Formula (I') below are each bonded to another silicon atom (a silicon atom not illustrated in Formula (1')). Moreover, two oxygen atoms located above and below the silicon atom illustrated in the structure represented by formula (II') below are each bonded to another silicon atom (a silicon atom not illustrated in formula (II')).

[Chem. 3]

(I')

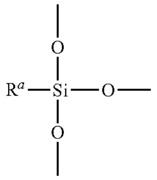

(II')

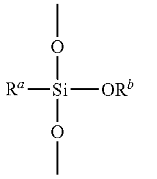

$R^a$ represents a group containing a cyclohexene oxide group, a substituted or unsubstituted aryl group, a substituted or unsubstituted aralkyl group, a substituted or unsubstituted cycloalkyl group, a substituted or unsubstituted alkyl group, a substituted or unsubstituted alkenyl group, or a hydrogen atom.

Examples of the aryl group include aryl groups having from 6 to 10 carbons, such as a phenyl group and a naphthyl group.

Examples of the aralkyl group include aralkyl groups having from 7 to 12 carbons, such as a benzyl group and a phenethyl group.

Examples of the cycloalkyl group include cycloalkyl groups having from 3 to 6 carbons, such as a cyclobutyl group, a cyclopentyl group, and a cyclohexyl group.

Examples of the alkyl group include linear or branched alkyl groups having from 1 to 6 carbons, such as a methyl group, an ethyl group, a propyl group, an n-butyl group, an isopropyl group, an isobutyl group, an s-butyl group, a t-butyl group, and an isopentyl group.

Examples of the alkenyl group include linear or branched alkenyl groups having from 2 to 6 carbons, such as a vinyl group, an allyl group, and an isopropenyl group.

Examples of the substituted aryl group, the substituted aralkyl group, the substituted cycloalkyl group, the substituted alkyl group, and the substituted alkenyl group described above include groups in which some or all of hydrogen atoms bonded to the main chain backbone of the aryl group, the aralkyl group, the cycloalkyl group, the alkyl group, or the alkenyl group described above are replaced with at least one selected from the group consisting of alkyl groups having from 1 to 6 carbons, aryl groups having from 6 to 10 carbons, RO groups, RCOO groups, RCO groups, siloxane groups, halogen atoms, mercapto groups, amino groups, and hydroxy groups. Note that R represents a hydrocarbon group, and examples thereof include an alkyl group having from 1 to 6 carbons, an aryl group having from 6 to 10 carbons, and a monovalent group in which two or more of these are bonded through a single bond.

The ($OR^b$) group above represents a hydroxy group or an alkoxy group having from 1 to 4 carbons. Examples of the alkoxy group having from 1 to 4 carbons include a methoxy group, an ethoxy group, a propoxy group, an isopropyloxy group, a butoxy group, and an isobutyloxy group.

The silsesquioxane may contain a structural unit that is a structural unit represented by Formula (I) or (II) above where $R^a$ in the formula is a substituted or unsubstituted aryl group (e.g., phenyl group) together with a structural unit that is a structural unit represented by Formula (I) or (II) above where $R^a$ in the formula is a group containing a cyclohexene oxide group.

That is, the silsesquioxane may contain a structural unit represented by Formula (I-1) below or a structural unit represented by Formula (II-1) below, and a structural unit represented by Formula (I-2) below or a structural unit represented by Formula (II-2) below. Note that the structural unit represented by Formula (I-1) and the structural unit represented by Formula (I-2) are T3 forms, and the structural unit represented by Formula (II-1) and the structural unit represented by Formula (II-2) are T2 forms:

$$[R^{a1}SiO_{3/2}] \quad (I\text{-}1)$$

where in Formula (I-1), $R^{a1}$ represents a group containing a cyclohexene oxide group;

$$[R^{a1}SiO_{2/2}(OR^b)] \quad (II\text{-}1)$$

where in Formula (II-1), $R^{a1}$ is the same as described above, and $R^b$ represents a hydrogen atom or an alkyl group having from 1 to 4 carbons;

$$[R^{a2}SiO_{3/2}] \quad (I\text{-}2)$$

where in Formula (I-2), $R^{a2}$ represents a substituted or unsubstituted aryl group; and $$[R^{a2}SiO_{2/2}(OR^b)] \quad (II\text{-}2)$$

where in Formula (II-2), $R^{a2}$ and $R^b$ are the same as described above.

The T3 forms/T2 forms (molar ratio), that is, the ratio of the content of the structural units represented by Formula (I) to the content of the structural units represented by Formula (II) (the former/the latter; molar ratio) or the ratio of the total content of the structural units represented by Formulas (I-1) and (I-2) to the total content of the structural units represented by Formulas (II-1) and (II-2) (the former/the latter; molar ratio) is, for example, from 5 to 500. The lower limit of the T3 forms/T2 forms (molar ratio) is preferably 7, particularly preferably 8, most preferably 9, and especially 10, from the viewpoint of obtaining an effect of improving hardness and scratch resistance of the resulting cured product. The upper limit of the T3 forms/T2 forms (molar ratio) is preferably 50, particularly preferably 30, most preferably 20, and especially 15. The T3 forms/T2 forms (molar ratio) can be determined, for example, by $^{29}$Si-NMR spectrum measurement. In the $^{29}$Si-NMR spectrum, a silicon atom in the T3 form and a silicon atom in the T2 form have signals (peaks) at different positions (chemical shift), and thus the molar ratio is determined by calculating the ratio of the integrated values of the respective peaks.

The $^{29}$Si-NMR spectrum of the silsesquioxane can be measured, for example, with the following instrument and conditions.

Measurement instrument: "JNM-ECA500NMR" (trade name, available from JEOL Ltd.)

Solvent: deuterochloroform

Cumulative number: 1800 times

Measurement temperature: 25° C.

In addition to the T units described above, the silsesquioxane may contain at least one selected from the group consisting of structural units represented by $[R^a{}_3SiO_{1/2}]$ (i.e., M units), structural units represented by $[R^a{}_2SiO]$ (i.e., D units), and structural units represented by $[SiO_2]$ (i.e., Q units). Note that $R^a$ in the formula above is the same as described above.

From the viewpoints of achieving high curability and forming a cured product having a high hardness, the proportion of the T units in the total amount of the structural units of the silsesquioxane [all structural units; total amount of the M units, the D units, the T units, and the Q units] (100 mol %) is preferably from 50 to 100 mol %, more preferably from 60 to 100 mol %, even more preferably from 65 to 100 mol %, particularly preferably from 70 to 100 mol %, and most preferably from 80 to 100 mol %.

From the viewpoints of achieving high curability and forming a cured product having a high hardness, the proportion of the structural units represented by Formulas (I) and (II) where $R^a$ in the formulas is a group containing a cyclohexene oxide group [i.e., total amount of the structural units represented by Formula (I-1) above and the structural units represented by Formula (II-1) above] in the total amount of the structural units of the silsesquioxane is preferably from 50 to 100 mol %, more preferably from 60 to 100 mol %, even more preferably from 65 to 100 mol %, particularly preferably from 70 to 100 mol %, most preferably from 80 to 99 mol %, and especially preferably from 85 to 96 mol %. Note that the proportion of the structural units is determined based on the composition of raw materials of the silsesquioxane. In addition, the proportion can be also determined by subjecting the silsesquioxane to NMR spectrum analysis.

From the viewpoint of forming a cured product having a high hardness, the proportion of the structural units represented by Formula (I) or (II) where $R^a$ in the formula is a substituted or unsubstituted aryl group (e.g., phenyl group) [i.e., total amount of the structural units represented by Formula (I-2) above and the structural units represented by Formula (II-2) above] in the total amount of the structural units of the silsesquioxane is preferably 50 mol % or less, more preferably 40 mol % or less, particularly preferably 30 mol % or less, most preferably 20 mol % or less, and especially preferably 10 mol % or less. Note that the lower limit of the proportion is, for example, 1 mol %, preferably 2 mol %, particularly preferably 3 mol %, and most preferably 4 mol %.

The proportion of the T units containing a group containing a cyclohexene oxide group [which is a total amount of the structural units represented by Formula (I) or the structural units represented by Formula (II) where $R^a$ in the formulas is a group containing a cyclohexene oxide group] in the total amount of T units constituting the silsesquioxane [which is a total amount of the structural units represented by Formula (I) and the structural units represented by Formula (II)] is preferably from 50 to 100 mol %, more preferably from 60 to 100 mol %, even more preferably from 65 to 100 mol %, particularly preferably from 70 to 100 mol %, and most preferably from 80 to 99 mol %.

The proportion of the T units containing a group containing a cyclohexene oxide group, which is a total amount of the structural units represented by Formula (I) or the structural units represented by Formula (II) where $R^a$ in the formulas is a group containing a cyclohexene oxide group, in the total amount of the structural units of the silsesquioxane [all structural units, which include the T units, the M units, the D units, and the Q units] (100 mol %) is, for example, from 50 to 100 mol %, preferably from to 100 mol %, more preferably from 65 to 100 mol %, particularly preferably from to 100 mol %, and most preferably from 80 to 99 mol %.

The molecular weight distribution (Mw/Mn) of the silsesquioxane determined by GPC, calibrated with standard polystyrene, is, for example, from 1.0 to 3.0, preferably from 1.1 to 2.0, more preferably from 1.2 to 1.9, particularly preferably from 1.45 to 1.80, and most preferably from 1.45 to 1.70. Setting the molecular weight distribution to 3.0 or less tends to increase the surface hardness of the resulting cured product higher. On the other hand, setting the molecular weight distribution to 1.0 or greater tends to result in forming a liquid and improve the handleability.

The number average molecular weight (Mn) of the silsesquioxane determined by GPC, calibrated with standard polystyrene, is, for example, from 500 to 10000, preferably from 1000 to 8000, particularly preferably from 1200 to 6000, most preferably from 1300 to 3000, and especially preferably from 1400 to 2500. When the number average molecular weight is 500 or greater, a cured product having a high hardness and excellent scratch resistance and heat resistance tends to be obtained. On the other hand, when the number average molecular weight is 10000 or less, good compatibility with another component is achieved, and usability tends to be excellent.

The epoxy group equivalent of the silsesquioxane is, for example, from 50 to 3000 g/eq. The upper limit thereof is preferably 2000 g/eq, more preferably 1500 g/eq, even more preferably 1000 g/eq, particularly preferably 500 g/eq, and most preferably 300 g/eq. The lower limit thereof is preferably 100 g/eq, and more preferably 150 g/eq. By setting the epoxy group equivalent to 3000 g/eq or less, a cured product having a high hardness and excellent scratch resistance and heat resistance tends to be obtained. Furthermore, by setting the epoxy group equivalent to 50 g/eq or greater, suitable fluidity can be achieved, and handleability tends to be excellent.

The silsesquioxane can be produced by subjecting a hydrolyzable silane compound to hydrolysis and polycondensation reactions.

The hydrolyzable silane compound at least contains a compound represented by Formula (a) below. The compound represented by Formula (a) is as follows:

$$R^aSi(X^1)_3 \tag{a}$$

In Formula (a), $X^1$ represents an $OR^b$ group or a halogen atom. $R^a$ and $R^b$ are the same as described above.

The hydrolyzable silane compound is the compound represented by Formula (a) where $R^a$ in the formula is a group containing a cyclohexene oxide group.

Two or more of the compounds represented by Formula (a) can be used in combination depending on structural units of the silsesquioxane to be produced. For example, when silsesquioxane having a main chain backbone made of a siloxane bond and a group containing a cyclohexene oxide group and a substituted or unsubstituted aryl group (e.g., a phenyl group) that are bonded to the main chain backbone is produced, a combination of a compound represented by Formula (a) where $R^a$ in the formula is a group containing a cyclohexene oxide group and a compound represented by Formula (a) where $R^a$ in the formula is a substituted or unsubstituted aryl group (e.g., phenyl group) is preferably used.

Besides the compound represented by Formula (a), the hydrolyzable silane compound may contain another hydrolyzable silane compound (e.g., hydrolyzable trifunctional silane compounds other than the compounds represented by Formula (a) above, hydrolyzable monofunctional silane compounds forming an M unit, hydrolyzable bifunctional silane compounds forming a D unit, and hydrolyzable tetrafunctional silane compounds forming a Q unit). By adjusting the used amount or composition of the hydrolyzable silane compound, a desired silsesquioxane can be produced.

The hydrolysis and polycondensation reactions of the hydrolyzable silane compound are preferably performed in the presence of an alkali metal catalyst from the viewpoint of suppressing decomposition of the cyclohexene oxide group and enabling formation of a siloxane bond. Examples of the alkali metal catalyst include alkali metal compounds such as hydroxides, carbonates, hydrogencarbonates, organic acid salts, alkoxides, and aryloxides of alkali metals. One of these can be used alone, or two or more in combination. In addition, these can be used in a state of being dissolved or dispersed in water, a solvent, or the like.

Examples of the hydroxides of alkali metals include lithium hydroxide, sodium hydroxide, potassium hydroxide, and cesium hydroxide.

Examples of the carbonates of alkali metals include lithium carbonate, sodium carbonate, potassium carbonate, and cesium carbonate.

Examples of the hydrogencarbonates of alkali metals include lithium hydrogencarbonate, sodium hydrogencarbonate, potassium hydrogencarbonate, and cesium hydrogencarbonate.

For the organic acid salts of alkali metals, a salt of an alkali metal and a monovalent organic acid is preferred, and examples thereof include carboxylates of alkali metals (preferably salts of alkali metals and monovalent carboxylic acids, and particularly preferably acetates of alkali metals), such as lithium acetate, sodium acetate, potassium acetate, and cesium acetate.

Examples of the alkoxides of alkali metals include $C_{1-5}$ alkoxides of alkali metals, such as lithium methoxide, sodium methoxide, sodium ethoxide, sodium isopropoxide, potassium ethoxide, and potassium t-butoxide.

Examples of the aryloxides of the alkali metals include $C_{6-11}$ aryloxides of alkali metals such as sodium phenoxide.

The amount of the alkali metal catalyst to be used is, for example, approximately from 0.002 to 0.200 mol with respect to 1 mol of the hydrolyzable silane compound.

The hydrolysis and polycondensation reactions of the hydrolyzable silane compound use water. The amount of water to be used is not particularly limited and can be appropriately adjusted in a range of 0.5 to 20 mol with respect to 1 mol of the hydrolyzable silane compound.

The reaction is preferably carried out in the presence of a solvent. Examples of the solvent include aromatic hydrocarbons, such as benzene, toluene, xylene, and ethylbenzene; ethers, such as diethyl ether, dimethoxyethane, tetrahydrofuran, and dioxane; ketones, such as acetone, methyl ethyl ketone, and methyl isobutyl ketone (MIBK); esters, such as methyl acetate, ethyl acetate, isopropyl acetate, and butyl acetate; amides, such as N,N-dimethylformamide and N,N-dimethylacetamide; nitriles, such as acetonitrile, propionitrile, and benzonitrile; and alcohols, such as methanol, ethanol, isopropyl alcohol, and butanol. One of these can be used alone or two or more in combination. Among these, the solvent is preferably a ketone and/or ether from the viewpoint of excellent solubility of water and silsesquioxane and not inhibiting the hydrolysis and polycondensation reactions of the hydrolyzable silane compound, and is especially preferably a ketone.

The amount of the solvent to be used is, for example, from 0 to 20 parts by weight with respect to 1 part by weight of the hydrolyzable silane compound.

The reaction temperature during the hydrolysis and polycondensation reactions of the hydrolyzable silane compound is preferably from 40 to 100° C., and more preferably from 45 to 80° C. In addition, the reaction time of the hydrolysis and polycondensation reactions is preferably from 0.1 to 10 hours, and more preferably from 1.5 to 8 hours. Furthermore, the hydrolysis and polycondensation reactions can be performed under normal pressure or can be performed under increased pressure or reduced pressure. Note that an atmosphere of the reaction may be any of an inert gas atmosphere, such as a nitrogen atmosphere or an argon atmosphere, or in the presence of oxygen, such as in the air.

After completion of this reaction, the resulting reaction product can be separated and purified by typical precipitation, washing, and filtration.

In the present disclosure, after completion of the hydrolysis and polycondensation reactions of the hydrolyzable silane compound, washing of the reaction solution by a washing treatment until the reaction solution becomes neutral is preferably performed. This is because, when the silsesquioxane having undergone the washing treatment is used, storage stability of the resulting curable composition can be improved.

The curable composition obtained by using the silsesquioxane having undergone the washing treatment has excellent storage stability, and viscosity increase percentage in a case where the curable composition is stored at 5° C. for 180 days calculated based on the following equation is, for example, 10% or less, preferably 5% or less, particularly preferably 3% or less, and especially preferably 1% or less.

$$\text{Viscosity increase percentage (\%)} = [(V2 - V1)/V1] \times 100$$

V1 represents a viscosity of a curable composition before storage, and V2 represents a viscosity of the curable composition after the storage.

The content of the silsesquioxane is, for example, preferably 70 wt. % or greater, more preferably 75 wt. % or greater, particularly preferably 80 wt. % or greater, and most preferably 90 wt. % or greater, with respect to the total amount of non-volatile content of the curable composition of the present disclosure.

The curable composition of the present disclosure may contain a compound other than the silsesquioxane as a curable compound; however, the proportion of the content of the silsesquioxane in all curable compounds contained in the curable composition is, for example, preferably 70 wt. % or greater, more preferably 75 wt. % or greater, particularly preferably 80 wt. % or greater, and most preferably 90 wt. % or greater. By allowing the curable composition to contain the silsesquioxane in the range described above, refractive index of the cured product of the curable composition can be made high, and because of this, a difference of the refractive index from that of a plastic lens made of a resin material having a medium refractive index (e.g., refractive index of approximately 1.49 to 1.61), such as a polyamide resin, can be made small, and thus effect of suppressing occurrence of interference fringes can be achieved. Furthermore, heat resistance of the cured product of the curable composition is improved, and cracking resistance is improved.

Solvent

The curable composition may contain a solvent. In a case where the curable composition contains a solvent, applicability is improved by the viscosity reduction, and a uniform film can be formed.

For the solvent, use of a solvent having excellent solubility of the silsesquioxane and the tetraazaporphyrin compound and having a boiling point at normal pressure of 150° C. or lower (preferably 130° C. or lower, particularly preferably 120° C. or lower. The lower limit of the boiling point is, for example, 50° C., preferably 60° C., and particularly preferably 70° C.) is preferred from the viewpoint of rapidly volatilizing the solvent after application of the curable composition and causing no bubbles in the cured product due to solvent.

Examples of the solvent include ketone-based solvents and alcohol-based solvents. One of these can be used alone or two or more in combination. For the solvent, among these, use of a ketone-based solvent is preferred from the viewpoint of particularly excellent solubility of the tetraazaporphyrin compound.

Note that, in a case where a ketone-based solvent is used, the curable composition tends to be gelled and storage stability may be reduced; however, when the silsesquioxane having undergone the washing treatment is used, the curable composition is not gelled even when a ketone-based solvent is used. That is, when the silsesquioxane having undergone the washing treatment is used and the ketone-based solvent is used, a curable composition having excellent visibility, antiglare effects, and contrast-enhancing effects, and excellent storage stability can be produced.

For the ketone-based solvent, for example, acetone (boiling point: 56° C.), methyl ethyl ketone (boiling point: 80° C.), and methyl isobutyl ketone (boiling point: 116° C.) are preferred.

For the solvent, another solvent may also be included besides the ketone-based solvent; however, the proportion of the ketone-based solvent with respect to the total amount of the solvent is, for example, preferably 60 wt. % or greater from the viewpoint of improving the solubility of the tetraazaporphyrin compound, and more preferably 70 wt. % or greater, particularly preferably 80 wt. % or greater, and most preferably 90 wt. % or greater.

Furthermore, the solvent may contain a solvent having a boiling point that is not within the range described above at normal pressure; however, from the viewpoint of achieving both excellent applicability and ease in drying after application, the proportion of such a solvent with respect to the total amount of the solvents is, for example, preferably 40 wt. % or less, more preferably 30 wt. % or less, particularly preferably 20 wt. % or less, and most preferably 10 wt. % or less.

The content (in a case where two or more types are contained, the total amount thereof) of the solvent is, for example, from 0.5 to 3 times (preferably from 1.0 to 2.5 times) the content by weight of the silsesquioxane containing a cyclohexene oxide group, and the content can be adjusted based on the viscosity required for the curable composition within the range described above.

For example, in a case where the curable composition is used for application by a dipping method, the viscosity at 60 rpm at 25° C. of the curable composition measured by using a B-type viscometer (rotor No. 1) is preferably approximately 3.0 to 5.5 mPa·s, more preferably from 3.5 to 5.0 mPa·s, and particularly preferably from 4.0 to 4.5 mPa·s. In this case, the content of the solvent is preferably approximately from 1.0 to 2.0 times, and particularly preferably from 1.5 to 2.0 times, the content by weight of the silsesquioxane containing a cyclohexene oxide group.

Curing Catalyst

The curing catalyst is a compound capable of initiating or accelerating a cationic polymerization reaction of the silsesquioxane.

In the curable composition of the present disclosure, use of a cationic polymerization initiator as the curing catalyst is preferred. The cationic polymerization initiator is a compound that initiates a curing reaction of a cationic curable compound contained in the curable composition by generating cations as active species.

Examples of the cationic polymerization initiator include thermal cationic polymerization initiators generating cations by heating and photocationic polymerization initiators generating cations by ultraviolet irradiation. These can be appropriately selected according to the application.

Examples of the thermal cationic polymerization initiator include 4-hydroxyphenyl-methyl-benzylsulfonium phenyl tris(pentafluorophenyl) borate, 4-hydroxyphenyl-methyl-(2-methylbenzyl) sulfonium phenyl tris(pentafluorophenyl) borate, 4-hydroxyphenyl-methyl-l-naphthylmethylsulfonium phenyl tris(pentafluorophenyl) borate, and p-methoxycarbonyloxyphenyl-benzyl-methylsulfonium phenyl tris (pentafluorophenyl) borate.

Examples of the photocationic polymerization initiator include (4-hydroxyphenyl)methylbenzylsulfonium tetrakis (pentafluorophenyl)borate; 4-(4-biphenylylthio)phenyl-4-biphenylylphenylsulfonium tetrakis(pentafluorophenyl)borate; 4-(phenylthio)phenyldiphenylsulfonium phenyltris (pentafluorophenyl)borate; [4-(4-biphenylylthio)phenyl]-4-biphenylylphenylsulfonium phenyltris(pentafluorophenyl) borate; diphenyl[4-(phenylthio)phenylsulfonium] hexafluoroantimonate; diphenyl[4-(phenylthio)phenyl] sulfonium tris(pentafluoroethyl)trifluorophosphate; diphenyl[4-(phenylthio)phenyl]sulfonium tetrakis(pentafluorophenyl)borate; diphenyl[4-(phenylthio)phenyl]sulfonium hexafluorophosphate; 4-(4-biphenylylthio)phenyl-4-biphenylylphenylsulfonium tris(pentafluoroethyl)trifluorophosphate; bis[4-(diphenylsulfonio)phenyl] sulfide phenyltris (pentafluorophenyl)borate; and [4-(2-thioxanthonylthio) phenyl]phenyl-2-thioxanthonylsulfonium phenyltris (pentafluorophenyl)borate.

The content of the cationic polymerization initiator is, for example, from 0.1 to parts by weight, preferably from 0.5 to 5 parts by weight, and particularly preferably from 1 to 3 parts by weight, with respect to 100 parts by weight of curable compounds contained in the curable composition.

Hard Coating Film

The hard coating film of the present disclosure is a membrane-like or film-like structure made of a cured product of the curable composition described above. The thickness of the hard coating film can be appropriately selected based on the use. In a case where a hard coated lens is formed by adhering the hard coating film onto a lens surface, the thickness is, for example, from 0.5 to 5 μm, and preferably from 1 to 3 μm.

The hard coating film can be produced by forming a coating film of the curable composition on a substrate surface and curing the formed coating film. As necessary, pre-drying (pre-curing) may be performed before the coating film is cured.

The method of forming a coating film of the curable composition is not particularly limited as long as the curable composition can be applied to a surface of a substrate, and examples thereof include a printing method, a coating method, a dipping method, a spraying method, and a spin coating method.

The method of curing the coating film of the curable composition can be appropriately selected based on the type of the cationic polymerization initiator contained in the curable composition. For example, in a case where the curable composition contains a thermal cationic polymerization initiator, the coating film of the curable composition can be cured by subjecting the coating film to a heat treatment. Furthermore, in a case where the curable composition contains a photocationic polymerization initiator, the coating film of the curable composition can be cured by irradiating the coating film with ultraviolet light.

The heat treatment conditions are not particularly limited, and the curing temperature is, for example, from 80 to 200° C. In a case where the substrate is a plastic, from the viewpoint of preventing deformation and discoloration of the substrate due to heat, the curing temperature is preferably from 90 to 150° C., and particularly preferably from 95 to 130° C. The curing time is preferably appropriately set based on the curing temperature and the thickness of the coating film and, for example, in a case of the curing temperature of 100° C., the curing time is approximately from 0.5 to 5 hours.

In a case where the ultraviolet irradiation is performed, ultraviolet light sources, for example, such as a UV-LED; a mercury lamp, such as a low-, medium-, or high-pressure mercury lamps; a mercury-xenon lamp; a metal halide lamp; a tungsten lamp; an arc lamp; an excimer lamp; an excimer laser; a semiconductor laser; a YAG laser; a laser system combining a laser and a non-linear optical crystal; and a high-frequency induced ultraviolet light generating device; can be used. The quantity (integrated irradiance) of the ultraviolet light to be irradiated is, for example, from 100 to 500 $mJ/cm^2$.

The hard coating film has a high surface hardness, and the pencil hardness of the hard coating film (film thickness: 2.0 μm) formed on a polyamide resin (trade name "TROGAMID CX7323", available from Daicel-Evonik Ltd.) film (thickness: 100 μm) is, for example, HB or higher, and preferably F or higher. Thus, excellent scratch resistance is achieved. Here, the pencil hardness can be evaluated according to the method described in JIS K 5600-5-4.

The hard coating film has a characteristic of selectively absorbing light in a wavelength region of from 570 to 605 nm (preferably from 575 to 600 nm, more preferably from 580 to 595 nm, and particularly preferably from 580 to 590 nm). The hard coating film thus has excellent antiglare effects and contrast-enhancing effects.

The transmission spectrum of the hard coating film has a sharp downward peak in a wavelength region of from 570 to 605 nm and has no peaks in other visible light region.

The transmittance (t1) of the minimum value of the downward peak is, for example, 85% or less, preferably 80% or less, and particularly preferably 75% or less. Furthermore, the transmittance (t1) is, for example, 30% or greater, preferably 40% or greater, and particularly preferably 45% or greater.

The transmittance (t2) in the wavelength of 550 nm in the transmission spectrum is, for example, 75% or greater, preferably 80% or greater, and particularly preferably 85% or greater.

The transmittance (t3) in the wavelength of 625 nm in the transmission spectrum is, for example, 75% or greater, preferably 80% or greater, more preferably 85% or greater, particularly preferably 90% or greater, and most preferably 95% or greater.

A ratio (t2/t1) of the transmittance (t2) to the transmittance (t1) is, for example, 1.1 or greater, preferably 1.12 or greater, particularly preferably 1.13 or greater, and most preferably 1.15 or greater.

A ratio (t3/t1) of the transmittance (t3) to the transmittance (t1) is, for example, 1.1 or greater, preferably 1.15 or greater, particularly preferably 1.2 or greater, and most preferably 1.25 or greater.

Furthermore, because the hard coating film has a low content of the tetraazaporphyrin compound, coloring caused by the tetraazaporphyrin compound can be suppressed. Thus, the hard coating film has a transmittance of light in, for example, a wavelength region of from 450 to 550 nm (preferably from 450 to 560 nm, and particularly preferably from 450 to 570 nm) and a wavelength region of from 625 to 700 nm (preferably from 605 to 700 nm, and particularly preferably from 600 to 700 nm) among visible light region of, for example, 80% or greater. Therefore, even when the hard coating film is provided on a surface of a lens, color of the lens is not deteriorated.

The luminous transmittance of the hard coating film is, for example, 78% or greater, preferably 78.5% or greater, more preferably 79% or greater, even more preferably 80% or greater, particularly preferably 83% or greater, and especially preferably 85% or greater. Thus, excellent visibility is achieved.

Note that the luminous transmittance (Tv) of the hard coating film is a function of spectral transmittance of the hard coating film and is calculated based on Equation (1) below:

[Math. 1]

$$\tau v = \frac{\int_{380}^{780} \tau(\lambda)V(\lambda)Sc(\lambda)d\lambda}{\int_{380}^{780} V(\lambda)Sc(\lambda)d\lambda} \tag{1}$$

τ(λ) represents a spectral transmittance of the hard coating film.

V(λ)Sc(λ) is an assigned weight based on visibility in light adaptation, and the values thereof are listed in Table 1 below.

TABLE 1

| Wavelength (nm) λ | Spectral luminance of source C V(λ)Sc(λ) |
|---|---|
| 380 | 0.0000 |
| 390 | 0.0000 |
| 400 | 0.0002 |

TABLE 1-continued

| Wavelength (nm) λ | Spectral luminance of source C V(λ)Sc(λ) |
|---|---|
| 410 | 0.0009 |
| 420 | 0.0037 |
| 430 | 0.0124 |
| 440 | 0.0265 |
| 450 | 0.0447 |
| 460 | 0.0701 |
| 470 | 0.1070 |
| 480 | 0.1635 |
| 490 | 0.2384 |
| 500 | 0.3439 |
| 510 | 0.4887 |
| 520 | 0.6533 |
| 530 | 0.8023 |
| 540 | 0.9250 |
| 550 | 0.9941 |
| 560 | 0.9950 |
| 570 | 0.9249 |
| 580 | 0.8081 |
| 590 | 0.6700 |
| 600 | 0.5375 |
| 610 | 0.4223 |
| 620 | 0.3188 |
| 630 | 0.2215 |
| 640 | 0.1459 |
| 650 | 0.0896 |
| 660 | 0.0509 |
| 670 | 0.0262 |
| 680 | 0.0136 |
| 690 | 0.0062 |
| 700 | 0.0030 |
| 710 | 0.0014 |
| 720 | 0.0006 |
| 730 | 0.0003 |
| 740 | 0.0002 |
| 750 | 0.0001 |
| 760 | 0.0001 |
| 770 | 0.0000 |
| 780 | 0.0000 |

Hard Coated Lens

The hard coated lens according to the present disclosure has a structure in which the hard coating film is provided on a lens surface. The hard coated lens may have another structure (e.g., polarizing film, antireflection film, mirror coating film, and protective film) besides the structure described above.

The lens is preferably a plastic lens. Examples of the lens material include plastics such as polyamide resins, polycarbonate resins, acrylic resins, allyl resins (diethylene glycol bis(allyl carbonate) homopolymers or copolymers), urethane resins, and thiourethane resins. One of these can be used alone or two or more in combination.

The thickness of the lens can be appropriately selected based on the use and is approximately from 1.0 to 3.0 mm. The surface shape of the lens is not particularly limited, and shapes such as planar surfaces and curved surfaces (convex surfaces or concave surfaces) can be freely chosen.

The hard coated lens can be produced by forming a coating film of the curable composition on a lens surface and curing the formed coating film. As the method of applying the curable composition and the method of curing the coating film, similar methods as the method for producing the hard coating film described above can be employed.

The hard coated lens selectively absorbs light in a wavelength region of from 570 to 605 nm (preferably from 575 to 600 nm, more preferably from 580 to 595 nm, and particularly preferably from 580 to 590 nm) because the hard coated lens has the hard coating film described above on the lens surface, and the transmission spectrum of the hard coated lens has a sharp downward peak in the wavelength region described above. The hard coated lens thus has excellent antiglare effects and contrast-enhancing effects.

The lens constituting the hard coated lens is not particularly limited. In a case where the hard coated lens has a structure in which the hard coating film is provided on a surface of a lens (76 φmm; thickness at the center part: 2.2 mm; corresponding to a curve of curvature of 6) made of a polyamide resin (trade name "TROGAMID CX7323", available from Daicel-Evonik Ltd.), the transmittance (t1') of the minimum value of the downward peak appearing in the wavelength region of 570 to 605 nm, the transmittance (t2') at the wavelength of 550 nm of the transmission spectrum, and the transmittance (t3') at the wavelength of 625 nm of the transmission spectrum in the transmission spectrum of the hard coated lens have the following characteristics.

The transmittance (t1') is, for example, 85% or less, preferably 80% or less, particularly preferably 75% or less, and most preferably 70% or less. Furthermore, the transmittance (t1') is, for example, 30% or greater, preferably 40% or greater, and particularly preferably 45% or greater.

The transmittance (t2') in the wavelength of 550 nm in the transmission spectrum is, for example, 73% or greater, preferably 75% or greater, and particularly preferably 80% or greater.

The transmittance (t3') in the wavelength of 625 nm in the transmission spectrum is, for example, 73% or greater, preferably 75% or greater, particularly preferably 80% or greater, and most preferably 85% or greater.

A ratio (t2'/t1') of the transmittance (t2') to the transmittance (t1') is, for example, 1.05 or greater, preferably 1.1 or greater, particularly preferably 1.12 or greater, and most preferably 1.13 or greater.

A ratio (t37/t1') of the transmittance (t3') to the transmittance (t1') is, for example, 1.05 or greater, preferably 1.1 or greater, particularly preferably 1.15 or greater, and most preferably 1.2 or greater.

The hard coated lens has a transmittance of light in, for example, a wavelength region of from 450 to 550 nm (preferably from 450 to 560 nm, and particularly preferably from 450 to 570 nm) and a wavelength region of from 625 to 700 nm (preferably from 605 to 700 nm, and particularly preferably from 600 to 700 nm) among visible light region of, for example, 80% or greater. Thus, high visibility is achieved.

The hard coated lens [e.g., the hard coated lens having a structure in which the hard coating film is provided on the surface of the lens (76 φmm; thickness at the center part: 2.2 mm; corresponding to a curve of curvature of 6) made of the polyamide resin] has a high luminous transmittance, which is, for example, 78% or greater, preferably 78.5% or greater, particularly preferably 79% or greater, and most preferably 79.5% or greater. Thus, excellent visibility is achieved.

The luminous transmittance of the hard coated lens is a function of spectral transmittance of the hard coated lens. The luminous transmittance of the hard coated lens can be calculated by replacing the spectral transmittance [τ(λ)] of the hard coating film in Equation (1) above with a spectral transmittance [τ(λ)'] of the hard coated lens.

Since the hard coated lens has the characteristics described above, the hard coated lens has excellent visibility. In addition, antiglare effects and contrast-enhancing effects are also excellent, and scratch resistance is also excellent.

Furthermore, the hard coated lens has excellent heat resistance and cracking resistance. In addition, occurrence of interference fringes due to refractive index difference between the lens and the hard coating film is suppressed.

Furthermore, because coloring due to the tetraazaporphyrin compound is suppressed for the hard coating film, the hard coated lens of the present disclosure having the hard coating film allows more color choices. For lenses for correction (e.g., for myopia, for astigmatism, or for hyperopia), the lens power is adjusted by changing the thickness of the lens. In a case where the tetraazaporphyrin compound is kneaded into a lens, there is an issue of causing hue difference between a thick part and a thin part of the lens; however, the hard coated lens of the present disclosure can prevent the occurrence of hue difference due to the thickness of the lens because there is no need for the tetraazaporphyrin compound to be contained in the lens. Thus, by using the hard coated lens of the present disclosure, spectacles having high decorative value can be provided.

Spectacles

Spectacles of the present disclosure are things worn around eyes and include the hard coated lenses described above. The spectacles include not only typical spectacles but also sunglasses and goggles.

The spectacles have excellent visibility, high antiglare effects, high contrast-enhancing effects, and high decorative value. In addition, surfaces of the spectacles have high hardness and excellent scratch resistance.

Each of the configurations, their combinations, and the like of the present disclosure above is an example, and addition, omission, substitution, and change of the configuration can be appropriately made without departing from the gist of the present disclosure. In addition, the present disclosure is not limited by the embodiments and is limited only by the claims.

EXAMPLES

Hereinafter, the present disclosure will be described in more detail based on examples, but the present disclosure is not limited by these examples.

Preparation Example 1 (Preparation of SQ1)

To a 300-mL reaction vessel equipped with a thermometer, a stirrer, a reflux condenser, and a nitrogen inlet tube, 161.5 mmol (39.79 g) of 2-(3,4-epoxycyclohexyl)ethyltrimethoxysilane (hereinafter, referred to as “EMS”), 9 mmol (1.69 g) of phenyltrimethoxysilane (hereinafter, referred to as “PMS”), and 165.9 g of acetone were charged under a nitrogen stream, and the temperature was raised to 50° C. To the mixture thus obtained, 4.70 g of 5% potassium carbonate aqueous solution (1.7 mmol as potassium carbonate) was added dropwise over 5 minutes, and then 1700 mmol (30.60 g) of water was added dropwise over 20 minutes. No significant temperature increase occurred during the dropwise additions. A polycondensation reaction was then carried out under a nitrogen stream for 4 hours while the temperature was maintained at 50° C.

After the polycondensation reaction, the product in the reaction solution was analyzed, and the number average molecular weight was found to be 1911, and the molecular weight distribution was found to be 1.47. The ratio of the T3 forms to the T2 forms [T3 forms/T2 forms] of the product was 10.3.

Subsequently, the reaction solution was cooled and washed with water until the lower layer liquid became neutral. The upper layer liquid was collected, and then the solvent was removed by distillation from the upper layer liquid under conditions of 1 mmHg and 40° C., and a colorless, transparent liquid product (2-(3,4-epoxycyclohexyl)ethyl group-containing silsesquioxane; epoxy group equivalent: 195 g/eq; SQ1) was obtained.

Preparation Examples 2 to 5 (Preparation of SQ 2 to 5)

Each 2-(3,4-epoxycyclohexyl)ethyl group-containing silsesquioxane (SQ2 to 5) was obtained in the same manner as in Preparation Example 1 except for changing the reaction conditions to those listed in Table 2 below.

TABLE 2

| | | Preparation Example 1 SQ1 | Preparation Example 2 SQ2 | Preparation Example 3 SQ3 | Preparation Example 4 SQ4 | Preparation Example 5 SQ5 |
|---|---|---|---|---|---|---|
| Reaction conditions | EMS (g) | 39.79 | 39.79 | 105.3 | 105.3 | 105.3 |
| | PMS (g) | 1.69 | 1.69 | 4.46 | 4.46 | 4.46 |
| | Solvent | Acetone | Acetone | Acetone | MIBK | MIBK |
| | Solvent amount (g) | 165.9 | 165.9 | 439.2 | 432.9 | 439.2 |
| | Reaction Temperature (° C.) | 50 | 50 | 30 | 80 | 80 |
| | 5% $K_2CO_3$aq (g) | 4.7 | 4.7 | 12.4 | 11.1 | 11.1 |
| | $H_2O$ (g) | 30.6 | 30.6 | 81 | 11.4 | 11.4 |
| | Reaction time (h) | 4 | 1 | 2 | 5 | 3 |

Comparative Preparation Example 1 (Preparation of SQ6)

300.0 mmol (70.9 g) of 3-glycidyloxy propyltrimethoxysilane, and 283.6 g of acetone were charged under a nitrogen stream into a 1000 mL reaction vessel equipped with a thermometer, a stirrer, a reflux condenser, and a nitrogen inlet tube, and the temperature was raised to 50° C. To the mixture thus obtained, 8.29 g of a 5% potassium carbonate aqueous solution (3.0 mmol of potassium carbonate) was added dropwise over 5 minutes, to which 3000.0 mmol (54.00 g) of water was added dropwise over 20 minutes. No significant temperature increase occurred during the drop-wise additions. Subsequently, a polycondensation reaction was performed under a nitrogen stream for 5 hours while maintaining the temperature at 50° C.

Next, the reaction solution was cooled and, simultaneously, 141.8 g of MIBK and 104.2 g of a 5% saline solution were added. The solution was transferred to a 1 L separation funnel, then 141.8 g of MIBK was added again, and rinsing with water was performed. After the separation, the water layer was removed, and rinsing with water was performed until the lower layer liquid became neutral. The upper layer liquid was then fractioned, after which the solvent was distilled away from the upper layer liquid under conditions of 1 mmHg and 50° C. and 67.40 g of a colorless, transparent liquid product (3-glycidyloxypropyl group-containing poly-organosilsesquioxane; epoxy group equivalent: 160 g/eq; SQ6) containing 28.28 wt. % of MIBK was obtained.

The number average molecular weight (Mn), the molecular weight distribution, and the ratio of the T3 forms to the T2 forms [T3 forms/T2 forms] of the product obtained in each of Preparation Examples and Comparative Preparation Examples were determined by the methods described below. The results are summarized and indicated in Table 3 below.

The number average molecular weight (Mn) and the molecular weight distribution were determined by GPC analysis under the following conditions.

Alliance HPLC System 2695 (available from Waters)

Refractive Index Detector 2414 (available from Waters)

Column: Tskgel $GMH_{HR}$-M (available from Tosoh Corporation)×2

Guard column: Tskgel guard column $H_{HR}L$ (available from Tosoh Corporation)

Column oven: Column Heater U-620 (available from Sugai)

Solvent: THF

Measurement Condition: 40° C.

The ratio of T3 forms to the T2 forms [T3 forms/T2 forms] in the product was measured by $^{29}$Si-NMR spectrum using JEOL ECA500 (500 MHz). Specifically, [T3 forms/T2 forms] was determined by calculating integration ratio of a signal at −64 to −70 ppm (signal of a silicon atom of a T3 form where $R^a$ is 2-(3,4-epoxycyclohexyl)ethyl) to a signal at −54 to −60 ppm (signal of a silicon atom of a T2 form where $R^b$ is 2-(3,4-epoxycyclohexyl)ethyl) in the $^{29}$Si-NMR spectrum.

TABLE 3

| | Preparation Example 1 SQ1 | Preparation Example 2 SQ2 | Preparation Example 3 SQ3 | Preparation Example 4 SQ4 | Preparation Example 5 SQ5 | Comparative Preparation Example 1 SQ6 |
|---|---|---|---|---|---|---|
| Mn | 1911 | 1429 | 1557 | 1958 | 2143 | 1568 |
| Molecular weight distribution | 1.47 | 1.37 | 1.27 | 1.54 | 1.52 | 1.36 |
| T3 forms/T2 forms (molar ratio) | 10.3 | 6 | 4.1 | 19.2 | 17.1 | 17.1 |

Reference Example 1

A hard coating solution was obtained by mixing SQ1 obtained by Preparation Example 1 (100 parts by weight), MIBK (available from Kanto Chemical Co., Inc.; 20 parts by weight), and a curing catalyst ([diphenyl[4-(phenylthio)phenyl]sulfonium tris(pentafluoroethyl)trifluorophosphate]; 1 part by weight).

A hard coating film was prepared by the following method using the obtained hard coating solution, and surface hardness and scratch resistance of the obtained hard coating film were evaluated.

Surface Hardness Evaluation

The obtained hard coating solution was applied to a transparent polyamide resin (refractive index: 1.52; trade name "TROGAMID CX7323", available from Daicel-Evonik Ltd.) film (thickness: 100 μm) in a manner that the thickness after being cured became 40 μm by using a wire bar, then allowed to stay in an oven at for 10 minutes (pre-bake), subjected to irradiation with ultraviolet light (irradiation conditions (irradiation dose): 312 mJ/cm$^2$, and irradiation intensity: 80 W/cm$^2$), and then subjected to heat treatment at 80° C. for 2 hours (aging). By this, the coated film of the hard coating solution was cured, and thus a hard coating film having a hard coating layer was obtained.

The scratch resistance of the obtained hard coating film was evaluated by the following method.

A #0000 steel wool was traveled back and forth on the surface of the hard coating layer of the hard coating film 100 times with a load of 1000 g/cm$^2$, and the presence or absence of scratches and the number of the scratches on the surface of the hard coating layer were confirmed. The scratch resistance was evaluated based on the following criteria.

Excellent: Scratches were absent.

Good: Scratches were present, and the number of scratches was from 1 to 10.

Marginal: Scratches were present, and the number of scratches was greater than 10 and 20 or less.

Poor: Scratches were present, and the number of scratches was greater than 20.

Surface Hardness Evaluation

A hard coating film having a hard coating layer (thickness: 2.0 μm) was obtained in the same manner as in Reference Example 1 above except that the application was performed in a manner that the thickness of the hard coating solution after the application and curing became 2.0 μm.

The pencil hardness of the hard coating layer surface of the obtained hard coating film was evaluated by a method according to JIS K 5600-5-4.

Reference Examples 2 to 6

Hard coating films were obtained by performing the same procedure as in Reference Example 1 except for changing SQ1 to those according to the Table 4 below, and the hard coating films were evaluated. The results are summarized and indicated in Table 4 below.

TABLE 4

| | | Reference Example 1 | Reference Example 2 | Reference Example 3 | Reference Example 4 | Reference Example 5 | Reference Example 6 |
|---|---|---|---|---|---|---|---|
| SQ1 | | 100 | — | — | — | — | — |
| SQ2 | | | 100 | — | — | — | — |
| SQ3 | | — | — | 100 | — | — | — |
| SQ4 | | — | — | — | 100 | — | — |
| SQ5 | | — | — | — | — | 100 | — |
| SQ6 | | — | — | — | — | — | 100 |
| Evaluation Results | Pencil hardness | 2H | F | B | F | H | 6B |
| | Scratch Resistance | Excellent | Good | Marginal | Good | Excellent | Poor |

Example 1 (Preparation of Curable Composition 1)

In a 3-L stainless steel container equipped with a stirrer and a nitrogen inlet tube, in a nitrogen stream, 516 g of methyl ethyl ketone, 451 g (solid content: 77.5%) of MIBK solution of SQ1 obtained in Preparation Example 1, 6.8 g of curing catalyst (trade name "SI-100L", available from Sanshin Chemical Industry Co., Ltd.), 1.1 g of leveling agent (trade name "Surflon S-243", available from AGC Seimi Chemical Co., Ltd.), 27 g of benzotriazole-based ultraviolet absorber (trade name "Tinuvin 1130", available from BASF Japan Ltd.), and 1.4 g of tetraazaporphyrin compound (compound represented by Formula (p-1) below; selective light absorption wavelength was in 570 to 605 nm; trade name "FDG-006", available from Yamada Chemical Co., Ltd.), which was a coloring powder, (the content corresponding to 4000 ppm by weight of the content of the SQ1) were added and stirred at 25° C. for 10 minutes, and thus a curable composition 1 was prepared. The viscosity (V1) at 60 rpm at 25° C. of the curable composition 1 was 4.2 mPa·s. Note that the viscosity was measured by using a B-type viscometer (rotor No. 1).

[Chem. 4]

(p-1)

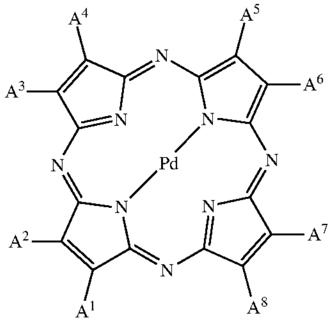

The storage stability of the curable composition 1 was evaluated by the following method.

That is, the curable composition 1 was sealed in an airtight container and stored at 5° C. for 180 days. The viscosity (V2) at 60 rpm at 25° C. of the composition after the storage was measured, and the viscosity increase percentage was calculated based on the following equation. As a result, the viscosity increase percentage was 1%, and it was confirmed that the storage stability was excellent.

$$\text{Viscosity increase percentage (\%)} = [(V2 - V1)/V1] \times 100$$

Example 2 (Production of Hard Coated Lens 1)

4970 g of transparent polyamide resin (refractive index: 1.52; trade name "TROGAMID CX7323", available from Daicel-Evonik Ltd.) and 30 g of benzotriazole-based ultraviolet absorber (trade name "Tinuvin 326", available from BASF Japan Ltd.) were mixed for 5 minutes by using a cylindrical tumbler mixer and then dried at 100° C. for 3 hours by using a small-sized dehumidifying hopper dryer, and thus a mixed material 1 was obtained.

By using an injection molding machine equipped with a mold for a lens (trade name "Tuparl TR150S", available from Sodic Plastech), the mixed sample 1 was injection-molded, and thus a plastic lens 1 (76 φmm; thickness at the center part: 2.2 mm; corresponding to a curve of curvature of 6) was produced.

The curable composition 1 obtained in Example 1 was applied to a convex face and a concave face of the plastic lens 1 in a manner that the thickness of the hard coating layer after curing became 2.0 μm, by a dipping method, and then heat-treated in an oven at 100° C. for 2 hours, and thus a hard coated lens 1 was obtained.

For the obtained hard coated lens 1, light transmittance was measured by the following method. The results are indicated in FIG. 1.

Transmittance Evaluation Method

The light transmittance was measured under the following conditions by using a spectrophotometer "CM-5" (available from Konica Minolta, Inc.). The results are indicated in FIG. 1.

Light source: Pulsed xenon lamp light source

Measurement wavelength range: 360 to 740 nm

Diffuse illumination

0° Direction light receiving system

The luminous transmittance of the hard coated lens 1 was 79.7%.

From FIG. 1, the transmittance (t1') of light at the wavelength of 585 nm, the transmittance (t2') of light at the wavelength of 550 nm, and the transmittance (t3') of light at the wavelength of 625 nm of the hard coated lens 1 were as follows.

t1'=70% t2'=80% t3'=87% t2'/t1'=1.14 t3'/t1'=1.24

The hard coating lens 1 was heat-treated in an electrical dryer at 90° C. for 60 minutes, and it was allowed to stand still in an environment at 25° C. for 1 hour. Then, the lens was visually observed using an LED light source for lens inspection (a visual inspection lamp available from Nagata Seisakusho Co., Ltd., trade name "NS-100NW (Y)"; illuminance setting: 30000 lx; distance between the light source and the measurement part: 200 mm). No cracks were observed.

Furthermore, when the hard coated lens 1 was observed by using a three-wavelength fluorescent lamp light source, interference fringes due to refractive index difference were not observed.

Example 3 (Production of Hard Coating Film 1)

Figure 2:
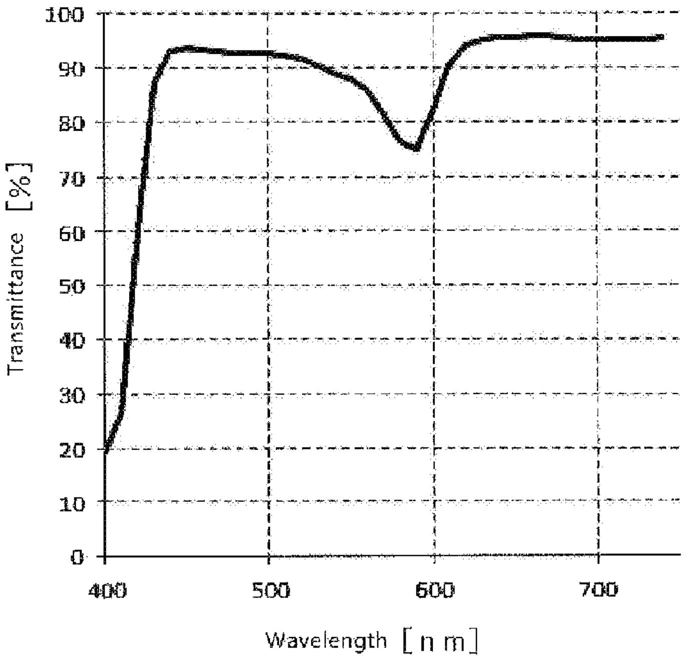
FIG. 2 indicates a transmittance curve for the hard coating film 1 obtained in Example.

The curable composition 1 obtained in Example 1 was applied to a glass plate by using a wire bar in a manner that the thickness after curing became 2 μm, and then heat-treated in an oven at 100° C. for 2 hours to cure the coated film. Then, a 5 cm square notch was formed by using a utility knife, and the coated film was then released from the glass plate, and thus a hard coating film 1 (thickness: 2.0 μm) was produced. For the obtained hard coating film 1, the light transmittance was measured according to "Transmittance evaluation method" described above. The results are indicated in FIG. 2. The luminous transmittance of the hard coating film 1 was 87.1%.

From FIG. 2, the transmittance (t1) of light at the wavelength of 585 nm, the transmittance (t2) of light at the wavelength of 550 nm, and the transmittance (t3) of light at the wavelength of 625 nm of the hard coating film 1 were as follows.

t1=75% t2 =88% t3 =95% t2/t1=1.17 t3/t1=1.27

From FIG. 2, it was found that the hard coating film 1 can selectively and significantly reduce the transmittance of the light at 585 nm. From this, it was found that, by using the hard coating film 1, spectacles having excellent visibility, antiglare effects, and contrast-enhancing effects can be obtained.

Comparative Example 1 (Preparation of Curable Composition 2)

Into a 1 L reaction vessel equipped with a thermometer, a stirrer, a reflux condenser, and a nitrogen inlet tube, 534 g of methyltriethoxysilane, 162 g of water, and 0.5 mL of 0.1 N hydrochloric acid were charged under a nitrogen stream, mixed well, and heated under reflux at 80° C. for 4 hours. The liquid, which was not homogeneous at first, became a transparent homogeneous layer. Ethanol generated as a byproduct in the reaction (including some water) was then removed by distillation and was concentrated to give a solution having a solid content of 50%, and the solution was aged under reflux for 20 hours. The solution was subjected to evaporation of the solvent in a thin evaporator in a short period of time, within 1 minute, and thus a methyl group-containing silsesquioxane in a solid flake form was obtained.

In a 500 mL flask, 27 g of ethanol and 3 g of deionized water were mixed to prepare 10% hydrous ethanol. To this, 30 g of the methyl group-containing silsesquioxane obtained as described above was added and vigorously agitated at for approximately 40 minutes, the methyl group-containing silsesquioxane was thus completely dissolved, and a 50% solution was obtained.

Separately, 23 g of ethanol, 2 g of deionized water, 1 g of a phenol salt of 1,8-diazabicyclo[5.4.0]undecene-7 (strong alkaline curing agent), and 1 g of a fluorine-based leveling agent (trade name "Ftergent 100", available from NEOS Corporation), and 13 g of acetic acid were added in this order, and thus a catalyst solution was obtained.

The 50% solution of the methyl group-containing silsesquioxane and the catalyst solution were mixed. To this, 0.1 g of tetraazaporphyrin compound (compound represented by Formula (p-1) above; selective light absorption wavelength was in 570 to 605 nm; trade name "FDG-006", available from Yamada Chemical Co., Ltd.), which was a coloring powder, (the content corresponding to 3300 ppm by weight of the content of the methyl group-containing silsesquioxane) were added while stirred at 25° C. for 30 minutes. However, undissolved coloring powder was visually observed.

Comparative Example 2 (Preparation of Curable Composition 3)

A curable composition 3 was prepared in the same manner as in Example 1 except that no tetraazaporphyrin compound was added.

Comparative Example 3 (Production of Hard Coated Lens 2)

9940 g of transparent polyamide resin (refractive index: 1.52; trade name "TROGAMID CX7323", available from Daicel-Evonik Ltd.), 60 g of benzotriazole-based ultraviolet absorber (trade name "Tinuvin 326", available from BASF Japan Ltd.), and 0.15 g of tetraazaporphyrin compound (compound represented by Formula (p-1) below; selective light absorption wavelength was in 570 to 605 nm; trade name "FDG-006", available from Yamada Chemical Co., Ltd.), which was a coloring powder, were mixed for 5 minutes by using a cylindrical tumbler mixer and then dried at 100° C. for 3 hours by using a small-sized dehumidifying hopper dryer, and thus a mixed material 2 was obtained. By using a non-bent single-screw extruder, the mixed sample 2 was extruded and pelletized under the following conditions.

Extrusion conditions: C1=250° C., C2=260° C., C3=270° C., C4=280° C., Die=270° C., screw rotation speed: 60 rpm, extrusion amount: 15 kg/hr A plastic lens 2 (76 φmm; thickness at the center part: 2.2 mm; corresponding to a curve of curvature of 6) was obtained in the same manner as in Example 2 except for using the pelletized mixed sample 2 described above in place of the mixed sample 1.

A hard coated lens 2 was obtained in the same manner as in Example 2 except for using the curable composition 3 in place of the curable composition 1 and except for using the plastic lens 2 in place of the plastic lens 1.

The tetraazaporphyrin compound content of the hard coated lens 2 was approximately 3 times by weight of the tetraazaporphyrin compound content of the hard coated lens 1.

The light transmittance of the hard coated lens 2 was measured by the same method as in Example 2. The results are indicated in FIG. 1. The luminous transmittance of the hard coated lens 2 was 77.7%.

From FIG. 1, the transmittance (t1') of light at the wavelength of 585 nm, the transmittance (t2') of light at the wavelength of 550 nm, and the transmittance (t3') of light at the wavelength of 625 nm of the hard coated lens 2 were as follows.

t1'=73% t2'=75% t3'=84% t2'/t1'=1.03 t3'/t1'=1.15

From FIG. 1, the hard coated lens 1 was superior to the hard coated lens 2 in terms of degree of reduction of the transmittance of light in a wavelength region of 570 to 605 nm although the content of the tetraazaporphyrin compound in the hard coated lens 1 was approximately ⅓ of the amount in the hard coated lens 2. Furthermore, the hard coated lens 1 suppressed the reduction of the transmittance of light outside the wavelength region described above compared to the case of the hard coated lens 2. Furthermore, because the content of the tetraazaporphyrin compound in the hard coated lens 1 was approximately ⅓ of the amount in the hard coated lens 2, coloring of the lens was suppressed, and the luminous transmittance of the hard coated lens 1 was higher than that of the hard coated lens 2.

From these, when the hard coated lens 1 is used, compared to the case where the hard coated lens 2 is used, light at wavelength that is easily sensed by human eyes can be transmitted in a well-balanced manner, and thus superior contrast is achieved. That is, by using the hard coated lens 1, excellent visibility can be ensured, and eyestrain can be suppressed.

As a summary of the above, configurations and variations of the present disclosure are described below.

[1] A curable composition including: silsesquioxane containing a cyclohexene oxide group, and a tetraazaporphyrin compound having an absorption peak in a wavelength region of 570 to 605 nm, in which a content of the tetraazaporphyrin compound is from 1000 to 10000 ppm by weight of a content of the silsesquioxane.

[2] The curable composition according to [1], in which the silsesquioxane contains a structural unit represented by Formula (I) and a structural unit represented by Formula (II) below:

$$[R^{a}SiO_{3/2}] \quad (I)$$

where in Formula (I), $R^a$ represents a group containing a cyclohexene oxide group, a substituted or unsubstituted aryl group, a substituted or unsubstituted aralkyl group, a substituted or unsubstituted cycloalkyl group, a substituted or unsubstituted alkyl group, a substituted or unsubstituted alkenyl group, or a hydrogen atom; and $$[R^{a}SiO_{2/2}(OR^{b})] \quad (II)$$

where in Formula (II), $R^a$ is the same as described above, and $R^b$ represents a hydrogen atom or an alkyl group having from 1 to 4 carbons;

in which a ratio of a content of the structural unit represented by Formula (I) to a content of the structural unit represented by Formula (II) (former/latter; molar ratio) is from 5 to 500; and a proportion of the structural units represented by Formulas (I), (II), in which $R^a$ in the formulas represents a group containing a cyclohexene oxide group is from 50 to 100 mol % with respect to a total amount of structural units of the silsesquioxane.

[3] The curable composition according to [1], in which the silsesquioxane is a compound having a main chain backbone with a siloxane bond and a group containing a cyclohexene oxide group and a substituted or unsubstituted aryl group that are bonded to the main chain backbone.

[4] The curable composition according to [1], in which the silsesquioxane contains a structural unit represented by Formula (I-1) below or a structural unit represented by Formula (II-1) below, and a structural unit represented by Formula (I-2) below or a structural unit represented by Formula (II-2) below:

$$[R^{a1}SiO_{3/2}] \quad (I\text{-}1)$$

where in Formula (I-1), $R^{a1}$ represents a group containing a cyclohexene oxide group;

$$[R^{a1}SiO_{2/2}(OR^{b})] \quad (II\text{-}1)$$

where in Formula (II-1), $R^{a1}$ is the same as described above, and $R^b$ represents a hydrogen atom or an alkyl group having from 1 to 4 carbons;

$$[R^{a2}SiO_{3/2}] \quad (I\text{-}2)$$

where in Formula (I-2), $R^{a2}$ represents a substituted or unsubstituted aryl group; and $$[R^{a2}SiO_{2/2}(OR^{b})] \quad (II\text{-}2)$$

where in Formula (II-2), $R^{a2}$ and $R^b$ are the same as described above.

[5] The curable composition according to [1], in which the silsesquioxane contains a structural unit represented by Formula (I-1) below or a structural unit represented by Formula (II-1) below, and a structural unit represented by Formula (I-2) below or a structural unit represented by Formula (II-2) below, in which a proportion of a total amount of the structural unit represented by Formula (I-1) and the structural unit represented by Formula (II-1) with respect to a total amount of structural units of the silsesquioxane is from 50 to 99 mol %, and a proportion of a total amount of the structural unit represented by Formula (I-2) and the structural unit represented by Formula (II-2) is from 1 to 50 mol % with respect to the total amount of the structural units of the silsesquioxane:

$$[R^{a1}SiO_{3/2}] \quad (I\text{-}1)$$

where in Formula (I-1), $R^{a1}$ represents a group containing a cyclohexene oxide group;

$$[R^{a1}SiO_{2/2}(OR^{b})] \quad (II\text{-}1)$$

where in Formula (II-1), $R^{a1}$ is the same as described above, and $R^b$ represents a hydrogen atom or an alkyl group having from 1 to 4 carbons;

$$[R^{a2}SiO_{3/2}] \quad (I\text{-}2)$$

where in Formula (I-2), $R^{a2}$ represents a substituted or unsubstituted aryl group; and $$[R^{a2}SiO_{2/2}(OR^{b})] \quad (II\text{-}2)$$

where in Formula (II-2), $R^{a2}$ and $R^b$ are the same as described above.

[6] The curable composition according to [4] or [5], in which a ratio of a total amount of the structural unit represented by Formula (I-1) and the structural unit represented by Formula (I-2) to a total amount of the structural unit represented by Formula (II-1) and the structural unit represented by Formula (II-2) (former/latter; molar ratio) is from 5 to 500.

[7] The curable composition according to any one of [1] to [6], in which a number average molecular weight of the silsesquioxane determined by GPC, calibrated with polystyrene standard, is from 500 to 10000.

[8] The curable composition according to any one of [1] to [7], in which an epoxy equivalent of the silsesquioxane is from 50 to 3000 g/eq.

[9] The curable composition according to any one of [1] to [8], which is a composition for hard coating layer formation.

[10] Use of the curable composition according to any one of [1] to [8] as a composition for hard coating layer formation.

[11] A method for producing a hard coating film, the method including applying the curable composition according to any one of [1] to [8].

[12] A method for producing a hard coating film, the method including applying the curable composition according to any one of [1] to [8] and obtaining a hard coating film having a pencil hardness measured in accordance with JIS K 5600-5-4 of HB or greater.

[13] A hard coating film containing a cured product of the curable composition according to any one of [1] to [8].

[14] The hard coating film according to [13], in which a pencil hardness measured in accordance with JIS K 5600-5-4 is HB or greater.

[15] The hard coating film according to [13] or [14], in which, in a transmission spectrum, a minimum value of a downward peak is in a wavelength region of from 570 to 605 nm, a transmittance (t1) of the minimum value is 80% or less, a ratio (t2/t1) of a transmittance (t2) at a wavelength of 550 nm to the transmittance (t1) is 1.1 or greater, and a ratio (t3/t1) of a transmittance (t3) at a wavelength of 625 nm to the transmittance (t1) is 1.1 or greater.

[16] A method for producing a hard coated lens, the method including: applying the curable composition according to any one of [1] to [8] to a lens surface and subjecting to curing to obtain a hard coated lens including a hard coating film containing a cured product of the curable composition.

[17] A hard coated lens including the hard coating film according to any one of to on a lens surface.

[18] The hard coated lens according to [17], in which luminous transmittance is 78% or greater.

[19] The hard coated lens according to [17], or [18], in which, in a transmission spectrum, a minimum value of a downward peak is in a wavelength region of from 570 to 605 nm, a transmittance (t1') of the minimum value is 85% or less, a ratio (t2'/t1') of a transmittance (t2') at a wavelength of 550 nm to the transmittance (t1') is 1.05 or greater, and a ratio (t3'/t1') of a transmittance (t3') at a wavelength of 625 nm to the transmittance (t1') is 1.05 or greater.

[20] Spectacles including the hard coated lens according to any one of [17] to [19].

[21] Sunglasses including the hard coated lens according to any one of [17] to [19].

[22] Goggles including the hard coated lens according to any one of [17] to [19].

INDUSTRIAL APPLICABILITY

By applying the curable composition of the present disclosure to a lens surface and subjecting to curing, a hard coated lens having excellent antiglare effects and contrast-enhancing effects can be produced. Thus, the curable composition can be suitably used as a composition for hard coating layer formation.

The invention claimed is:

1. A hard coating film comprising a cured product of a curable composition, said curable composition comprising: silsesquioxane containing a cyclohexene oxide group; and a tetraazaporphyrin compound having an absorption peak in a wavelength region of 570 to 605 nm, wherein a content of the tetraazaporphyrin compound is from 1000 to 10000 ppm by weight of a content of the silsesquioxane, and wherein a luminous transmittance of the hard coating film is 78% or greater.

2. The hard coating film according to claim 1, wherein the silsesquioxane contains a structural unit represented by Formula (I) and a structural unit represented by Formula (II) below:

$$[R^aSiO_{3/2}] \quad (I)$$

where in Formula (I), $R^a$ represents a group containing a cyclohexene oxide group, a substituted or unsubstituted aryl group, a substituted or unsubstituted aralkyl group, a substituted or unsubstituted cycloalkyl group, a substituted or unsubstituted alkyl group, a substituted or unsubstituted alkenyl group, or a hydrogen atom; and $$[R^aSiO_{2/2}(OR^b)] \quad (II)$$

where in Formula (II), $R^a$ is the same as described above, and $R^b$ represents a hydrogen atom or an alkyl group having from 1 to 4 carbons, wherein a ratio of a content of the structural unit represented by Formula (I) to a content of the structural unit represented by Formula (II) (former/latter; molar ratio) is from 5 to 500; and wherein 50 to 100 mol % of the total structural units represented by Formula (I) and (II) are structural units in which $R^a$ represents a group containing a cyclohexene oxide group.

3. The hard coating film according to claim 1, wherein, in a transmission spectrum, a minimum value of a downward peak is in a wavelength region of from 570 to 605 nm, a transmittance (t1) of the minimum value of the downward peak is 80% or less, a ratio (t2/t1) of a transmittance (t2) at a wavelength of 550 nm to the transmittance (t1) is 1.1 or greater, and a ratio (t3/t1) of a transmittance (t3) at a wavelength of 625 nm to the transmittance (t1) is 1.1 or greater.

4. A method for producing a hard coated lens, the method comprising applying the curable composition to a lens surface and subjecting to curing to obtain a hard coated lens including the hard coating film according to claim 1.

5. A hard coated lens comprising the hard coating film according to claim 1 on a lens surface.

6. Spectacles comprising the hard coated lens according to claim 5.

7. The hard coating film according to claim 2, wherein, in a transmission spectrum, a minimum value of a downward peak is in a wavelength region of from 570 to 605 nm, a transmittance (t1) of the minimum value of the downward peak is 80% or less, a ratio (t2/t1) of a transmittance (t2) at a wavelength of 550 nm to the transmittance (t1) is 1.1 or greater, and a ratio (t3/t1) of a transmittance (t3) at a wavelength of 625 nm to the transmittance (t1) is 1.1 or greater.

8. The hard coating film according to claim 1, further comprising a solvent, wherein a content of the solvent is from 0.5 to 3 times the content by weight of the silsesquioxane.

9. The hard coating film according to claim 2, further comprising a solvent, wherein a content of the solvent is from 0.5 to 3 times the content by weight of the silsesquioxane.

10. The hard coating film according to claim 3, further comprising a solvent, wherein a content of the solvent is from 0.5 to 3 times the content by weight of the silsesquioxane.

11. The hard coating film according to claim 7, further comprising a solvent, wherein a content of the solvent is from 0.5 to 3 times the content by weight of the silsesquioxane.

* * * * *